(12) United States Patent
Morgan

(10) Patent No.: US 10,967,524 B1
(45) Date of Patent: Apr. 6, 2021

(54) SYSTEM AND METHOD FOR CONVERSION OF ROTATIONAL MOTION INTO LINEAR ACTUATION BY MECHANICAL STACKING OR UNSTACKING OF CONNECTED LINKS

(71) Applicant: James P. Morgan, West Lebanon, NH (US)

(72) Inventor: James P. Morgan, West Lebanon, NH (US)

( * ) Notice: Subject to any disclaimer, the term of this patent is extended or adjusted under 35 U.S.C. 154(b) by 203 days.

(21) Appl. No.: 16/009,155

(22) Filed: Jun. 14, 2018

Related U.S. Application Data

(60) Provisional application No. 62/520,492, filed on Jun. 15, 2017.

(51) Int. Cl.
*B25J 15/02* (2006.01)
*B25J 18/06* (2006.01)
(Continued)

(52) U.S. Cl.
CPC ............. *B25J 15/022* (2013.01); *B25J 9/102* (2013.01); *B25J 18/06* (2013.01); *B25J 9/1635* (2013.01)

(58) Field of Classification Search
CPC ........ B25J 9/102; B25J 9/1635; B25J 15/022; B25J 18/06; B25J 9/106; B25J 15/0233; B25J 15/0266; Y10T 74/20323; F16G 13/00; F16G 13/02; F16G 13/06; F16G 13/07; F16G 13/12; F16G 13/18; F16G 13/20; F16G 13/22; F16G 13/24
See application file for complete search history.

(56) References Cited

U.S. PATENT DOCUMENTS 3,864,983 A  2/1975 Jacobsen
4,843,921 A  7/1989 Kremer
(Continued)

FOREIGN PATENT DOCUMENTS

DE  202010011541 U1  11/2011
DE  102012016409 A1   2/2014
(Continued)

OTHER PUBLICATIONS

Reinicke et al., "Rotary-To-Axial Motion Converter for Valve", NASA Technical Reports Server, Oct. 1, 1991, p. 76, vol. 15, No. 10, Publisher: NASA—United States, Published in: US.

*Primary Examiner* — Prasad V Gokhale
(74) *Attorney, Agent, or Firm* — Loginov & Associates, PLLC; William A. Loginov

(57) ABSTRACT

A Link Stacking Actuator is a scalable device that will contract or expand upon the application of rotational force. This rotational force is converted into linear force in contraction and this contraction can be released for expansion. Contraction and expansion are determined by the relative direction of rotational force applied. The device only generates linear force when contracting. Expansion is simply a relaxation of the device. The conversion of rotational force to contraction is achieved by mechanical stacking of interconnected links that fold or stack into a structure when rotational torsion is applied from a motor against a fixed mount-point or another counter-rotating motor. When used in oppositional pairs, these devices can be used to actuate hinged beams such as robotic arms, legs, and fingers. The device can also be used for direct lift applications when configured in multiple parallel sets.

20 Claims, 14 Drawing Sheets

(51) Int. Cl.
B25J 9/10 (2006.01)
B25J 9/16 (2006.01)

(56) References Cited

U.S. PATENT DOCUMENTS

| | | | | |
|---|---|---|---|---|
| 7,477,965 | B2 * | 1/2009 | Soham | B25J 9/104 |
| | | | | 140/149 |
| 7,503,163 | B2 * | 3/2009 | Deffner | B68B 1/08 |
| | | | | 54/6.1 |
| 8,237,390 | B2 | 8/2012 | Godler | |
| 8,256,310 | B2 | 9/2012 | Godler | |
| 9,079,465 | B1 * | 7/2015 | Sanftleben | B60D 1/58 |
| 9,272,425 | B2 * | 3/2016 | Garcia | B25J 15/0009 |
| 2005/0217220 | A1 * | 10/2005 | Blocker | B68B 1/06 |
| | | | | 54/24 |
| 2009/0249903 | A1 * | 10/2009 | Godler | F16H 19/0654 |
| | | | | 74/89.2 |
| 2011/0126650 | A1 | 6/2011 | Sorensen et al. | |
| 2018/0207836 | A1 * | 7/2018 | Peterson | B27L 1/122 |

FOREIGN PATENT DOCUMENTS

| | | |
|---|---|---|
| DE | 202014103875 U1 | 11/2015 |
| WO | 2015063524 A1 | 5/2015 |

* cited by examiner

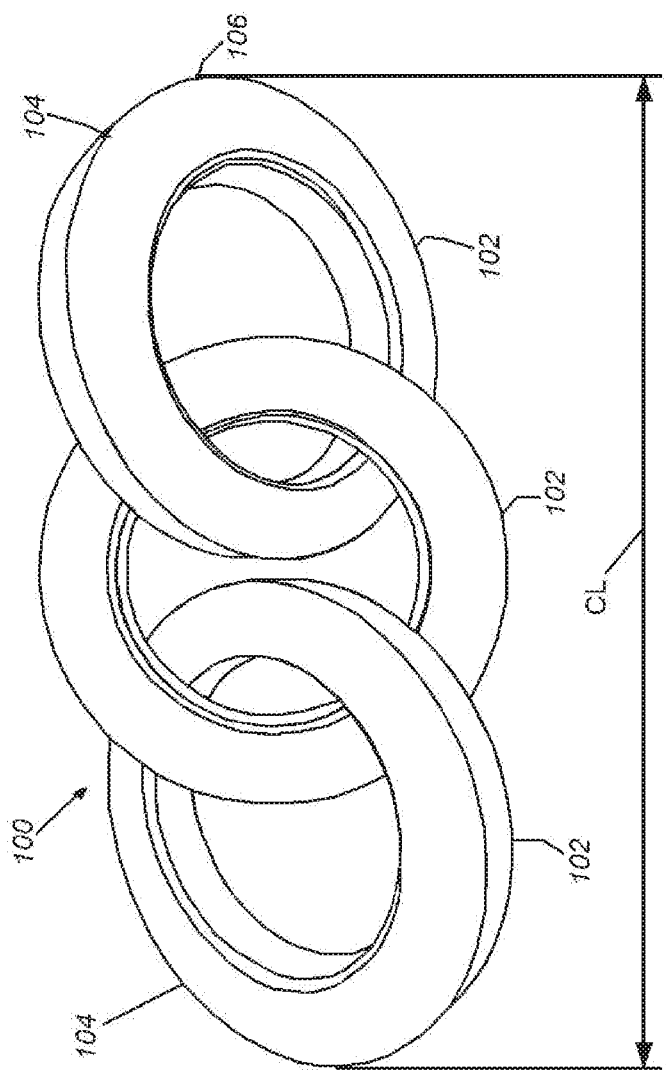

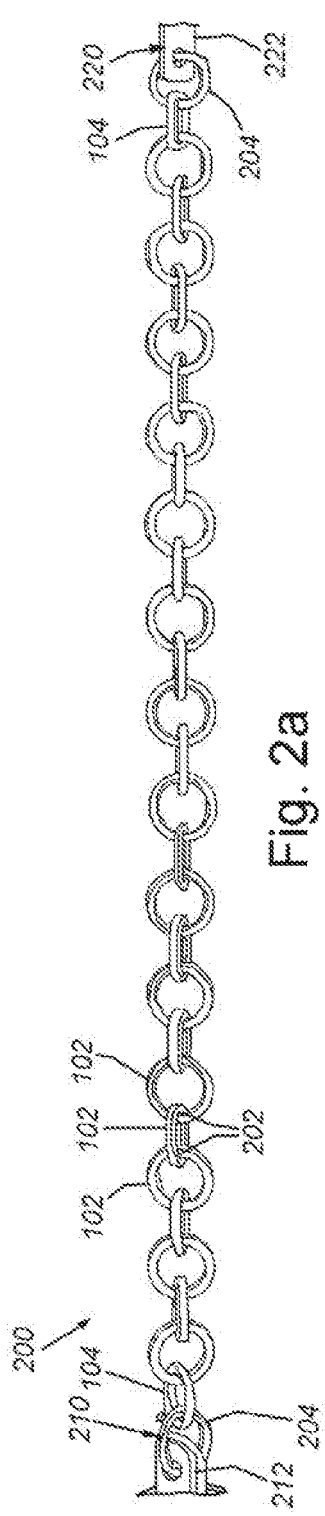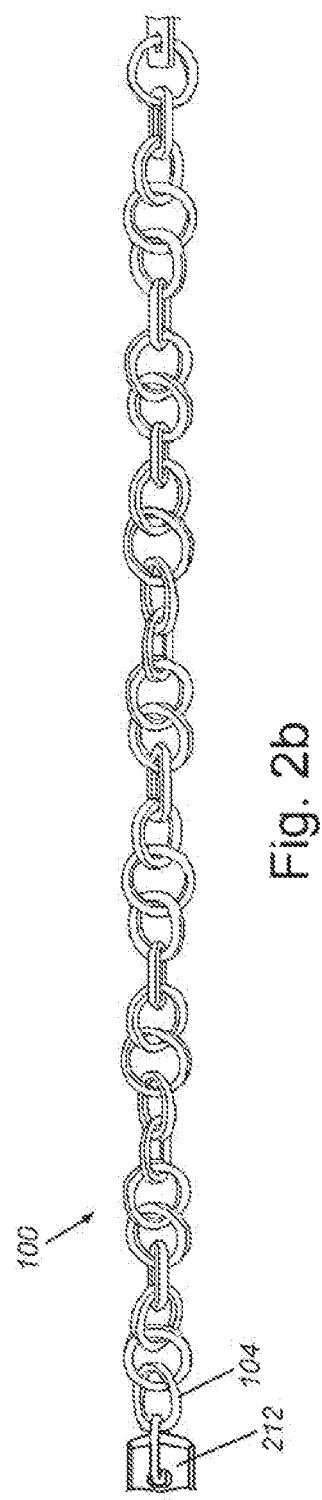

SYSTEM AND METHOD FOR CONVERSION OF ROTATIONAL MOTION INTO LINEAR ACTUATION BY MECHANICAL STACKING OR UNSTACKING OF CONNECTED LINKS

RELATED APPLICATION

This application claims the benefit of U.S. Provisional Application Ser. No. 62/520,492, entitled SYSTEM AND METHOD FOR CONVERSION OF ROTATIONAL MOTION INTO LINEAR ACTUATION BY MECHANICAL STACKING OR UNSTACKING OF CONNECTED LINKS, filed Jun. 15, 2017, by James P. Morgan, the teachings of which application are expressly incorporated herein by reference.

FIELD OF THE INVENTION

This invention relates to the actuation of mechanical joints through oppositional contraction and expansion, more particularly the robotic and prosthetic applications of actuators, in addition to direct contraction and expansion as applied against external forces

BACKGROUND OF THE INVENTION

Human kind has long sought to actuate mechanical systems using a number of specialized technologies, each with its own limitations. These limitations are becoming increasingly observable in a number of fields including technology miniaturization and extreme environment engineering.

Miniature and compact applications within the field of robotics and prosthetics require high strength, low weight, small form factor, and prefer high efficiency of operation. Extreme environment applications require operational temperature stability and durability in addition to the above. The goal of matching or exceeding human strength within a human envelope for terrestrial and space applications requires all of the above qualities for development in this industry.

Existing electroactive polymers are considered too weak and inefficient for most prosthetic applications. The high expense of their manufacture and their low efficiency deter much of the miniature robotics community as well. The weight and size of hydraulic systems are too great for many miniature and compact applications. Hydraulics are also difficult to incorporate into applications for use in many extreme environments such as space. Pneumatic artificial muscles suffer from many of the same pitfalls as hydraulics, while possessing the disadvantages of lower rigidity, strength, and durability. Direct gearbox drive systems suffer issues stemming from their relative size, weight, and usefulness of application. The appeal of twisted string actuators has been greatly dampened by the inherent and unavoidable durability and temperature stability restraints resulting from mechanical fatigue of the string media.

SUMMARY OF THE INVENTION

This invention overcomes disadvantages of the prior art by providing a system and method for actuating hinged joints in robotic applications that is compact, powerful, fast acting, smooth and quiet in operation and relatively low in power consumption. The system and method utilizes joined rings in the form of (wire) chain links constructed from an appropriate, long-wearing material, such as stainless steel, titanium, etc., with an appropriate wire cross section (e.g. square, rectangular, circular, ovular) that are joined to opposing attachment points on each of opposing sides of the joint hinge. At least one end rotates under operation of a controlled motor (e.g. servo or stepper motor), and the arrangement defines a link stacking actuator (LSA). LSAs can be placed on opposing sides of the hinge, and/or can be applied singly or in festooned arrangements on one or both sides. Likewise, one side can be biased by a spring (polymer, metallic, etc. and the LSA can be applied to the opposing side requiring a power stroke. Advantageously, the LSA can be arranged to snake around a knee or other hinged structure in a manner that allows reliable actuation despite the degree to which the LSA bends through the structure—thereby allowing an actuating motor to be placed relatively remote from the actual hinge.

In an illustrative embodiment, a link stacking actuator system can include a first chain comprising a series of adjacent links, the first chain having a first end and a second end, a first rotational motor connected to the first end, with the first rotational motor connected to a non-rotating surface, so that rotation of the first rotational motor twists the chain, thereby shortening the chain. The system can include a second rotational motor connected to the second end, and the second rotational motor can be connected to a non-rotating surface, so that rotation of the second rotational motor twists the chain, thereby shortening the chain. The system can include a second chain, the second chain having a third end and a fourth end, wherein the second end and the fourth end are connected to a mounting surface, and the system can further include a second rotational motor connected to the third end, so that rotation of the second rotational motor twists the second chain, thereby shortening the second chain, and wherein the first rotational motor and the second rotational motor can rotate individually or simultaneously so that the first chain and the second chain can be shortened individually or simultaneously.

Illustratively, the links can comprise a durable metal material, and/or can be joined at a joint thereof, so as to be free of gaps. The links can define a perimeter shape that is at least one of a circular, polygonal and elliptical. The links can also (or alternatively) define a cross section that is at least one of circular, polygonal and elliptical. The first rotating motor can be connected to a first member, and the second end can be connected to a second member and wherein the first member and the second member are connected by a hinge. The hinge defines at least one of a single-axis or multi-axis hinge. The hinge can include one or more pins, a spring structure or a living hinge structure. In embodiments, the first member and the second member are part of a robot manipulator having a controller that moves the first rotating motor based upon a desired degree of motion of the first member with respect to the second member In an illustrative embodiment, a link stacking actuator system can include a first chain having a first end and a second end, a second chain having a third end and a fourth end, a fixed mounting unit attached to a non-rotating surface, with the second end and the forth end connected to the fixed mounting unit, a rotating mounting unit with the first end and the third end connected to the rotating mounting unit, and a rotational motor connected to the rotating mounting unit, wherein the rotating motor rotates the rotating mounting unit, thereby twisting the first chain and the second chain around each other and shortening the length of the chains.

BRIEF DESCRIPTION OF THE DRAWINGS

The invention description below refers to the accompanying drawings, of which:

FIG. 1 is perspective view of a plurality of connected links in a chain for use in an exemplary link stacking actuator (LSA) arrangement according to an illustrative embodiment;

FIG. 2a is a perspective view of an LSA with a chain at a maximum length, according to an illustrative embodiment;

FIG. 2b is a perspective view of an LSA with an applied twisting force, according to the illustrative embodiment;

DETAILED DESCRIPTION

Figure 2C:
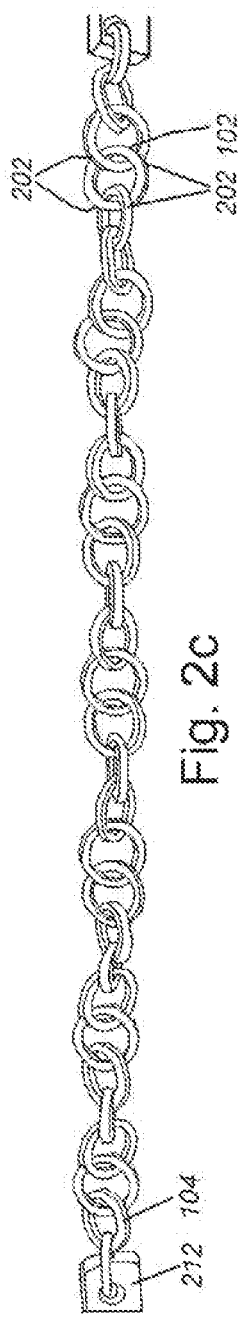
FIG. 2c is a perspective view of an LSA with an applied twisting force and a shortened chain length, according to the illustrative embodiment.

FIG. 1 is perspective view of a plurality of connected links in a chain for use in an exemplary Link Stacking Actuator (LSA) arrangement according to an illustrative embodiment. An LSA can include a chain 100 that can have a series of interlocking links 102, with each link being a complete loop that passes through adjacent links. The exemplary links in FIG. 1 are shown as having a disk or circular/annular perimeter shape with a rectangular cross section having rounded corners. However, other perimeter shapes and/or cross sections are specifically contemplated, including polygonal (square, rectangular, triangular, hexagonal), ovular/elliptical, and/or other cross sections or combinations. The shapes and/or cross sections can be provided variously in the same chain—for example where differing performance characteristics are desired along the length of a single chain. Likewise, the overall interior size of each link can be the same or vary within the same chain—or in different chains within an overall hinged joint to provide performance variation within the chain or between different chains in the unit.

Materials are highly variable and are generally long-wearing (durable) and avoid the generation of flakes, chips or dust. Metals, such as titanium alloys, stainless steel and/or certain high-strength polymers that should be clear to those of skill can be employed in various embodiments, among other materials. Combinations of materials can also be employed. Lubrication can be applied, impregnated and/or coated onto the links (e.g. PTFE, molybdenum disulfide, etc.), various materials and/or the material can be self-lubricating.

The chain 100 can have terminal links 104 at terminal ends of the chain 100, so that the terminal links 104 each pass through only one adjacent link. Terminal links 104 can each have a terminal point 106. A chain length CL can be defined as the distance between the two terminal points 106. At least one of the terminal links 104 can be connected to a servo, stepper motor, or other modality for providing rotating power, as will be known to persons having skill in the art. When a rotating, or twisting, force is applied to the terminal link, the chain length CL can become shorter/longer, as described more fully below.

FIG. 2a is a perspective view of an LSA 200 with a chain at a maximum length, according to an illustrative embodiment. A link 102 can contact an adjacent link 102 at a contact point 202. When the chain 100 is at a maximum length, links 102 can have contact points 202 that can be at a maximum possible distance from other contact points, with the contact points 202 on opposite ends of each link 102. This conformation of the chain 100 can be referred to as stage 0.

The LSA can have a powered end 210 and a fixed end 220. The powered end 210 can have a powered rotating shaft 212 that can be connected to a first terminal link 104. In the illustrative embodiment, the powered rotating shaft 212 is connected to the terminal link 104 by a connection link 204 that can be a coil of wire. In alternate embodiments, various means can be used to connect the terminal link 104 to source of rotational power, including welding the terminal link to a powered rotating shaft, or providing a clip at the end of a powered rotating shaft that can be used to engage the terminal link, or other means that will be obvious to one skilled in the art.

A fixed end can have a non-rotating mounting point 222 that can be connected to a second terminal link 104, so that the non-rotating mounting point 222 can prevent the second terminal link 104 from rotating. In the illustrative embodiment, a connection link 202 can connect the second terminal link 104 to the non-rotating mounting point 222, however, other means for preventing the second terminal link from rotating will be obvious.

FIG. 2b is a perspective view of an LSA with an applied twisting force, according to an illustrative embodiment.

When the powered rotating shaft 212 applies a rotational force to the terminal link 104, terminal link 104 can rotate, causing other links 102 in the chain 100 to rotate. FIG. 2c is a perspective view of an LSA with a further applied twisting force and a shortened chain length, according to an illustrative embodiment. As the powered rotating shaft 212 applies additional rotation to the terminal link 104, other links 102 in the chain 100 are also rotated. As the links 102 each rotate, the connection between adjacent links 102 can shift to having two connection points 202 between two adjacent links 102. In this conformation, an individual link 102 can have four connection points 202, with two connection points 202 contacting each adjacent link. The connection points 202 on a single link 102 are no longer at opposite ends of the link 102, and the two adjacent links on either side of a particular link are now closer together. Because the two adjacent links on either side of any particular link are now closer together, the entire chain length CL is now shorter. By rotating the terminal link 104 at the powered end 210, and preventing the terminal link at the fixed end from rotating, the chain can be shortened. The chain 100 has changed conformation from a fully expanded stage 0 conformation to a semi-rigid, shortened conformation that can be referred to as stage 1.

Figure 3A:
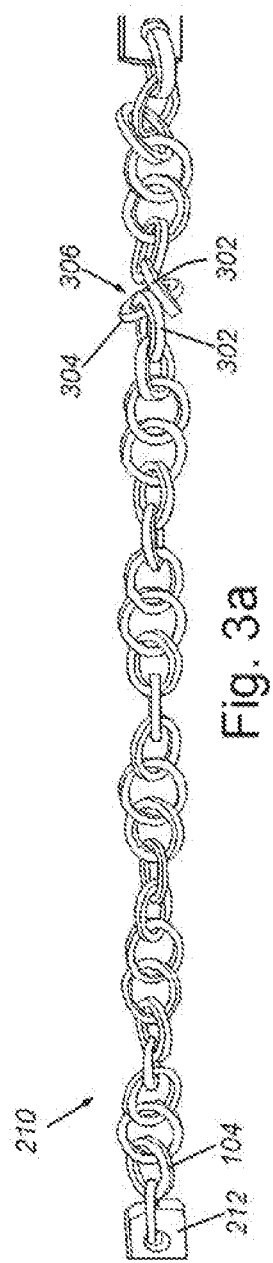
FIG. 3a is a perspective view of an LSA with an applied twisting force and stacked links, according to the illustrative embodiment.

FIG. 3a is a perspective view of an LSA with an applied twisting force and stacked links, according to the illustrative embodiment. As the powered rotating shaft 212 continues to apply additional rotation to the terminal link 104 at the powered end 210, other links 102 in the chain 100 continue to rotate. As links 102 are further rotated, the connection points between links can continue to shift until a stacking event occurs. When a stacking event occurs, two stacking links 302 on either side of a central link 304 can shift positions under the rotational force until the two stacking links 302 are in contact with each other, as shown in FIG. 3a. The two stacking links 302, which are not adjacent links in the chain, can now form a stack 306. The chain is now in a partially-stacked conformation, and this partially-stacked conformation can be referred to as stage 2.

Figure 3B:
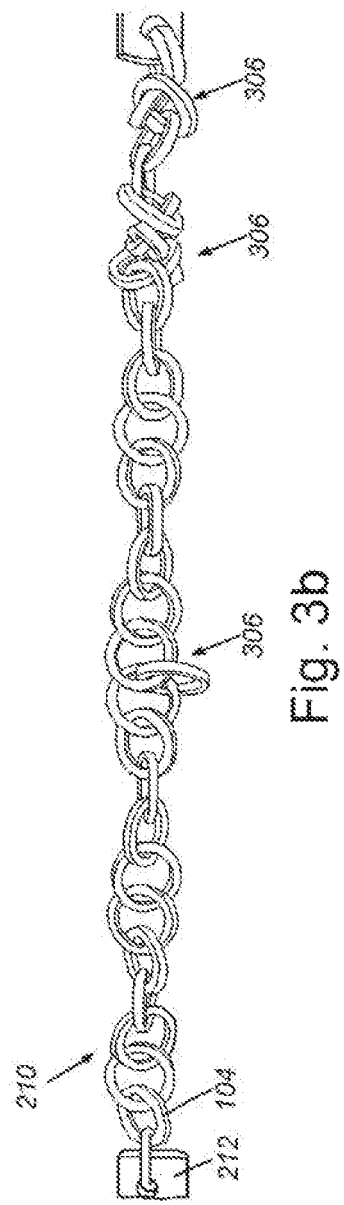
FIG. 3b is a perspective view of an LSA with an applied twisting force and additional stacked links, according to the illustrative embodiment.

FIG. 3b is a perspective view of an LSA with an applied twisting force and additional stacked links, according to the illustrative embodiment. As additional rotation is applied to the terminal link 104 at the powered end 210, additional stacks 306 can be formed throughout the chain 100. Stacking events can occur throughout consecutive links, so that a single link can be both a central link and a stacking link, and a stack 306 can now have an increasing number of links in a stack.

Figure 3C:
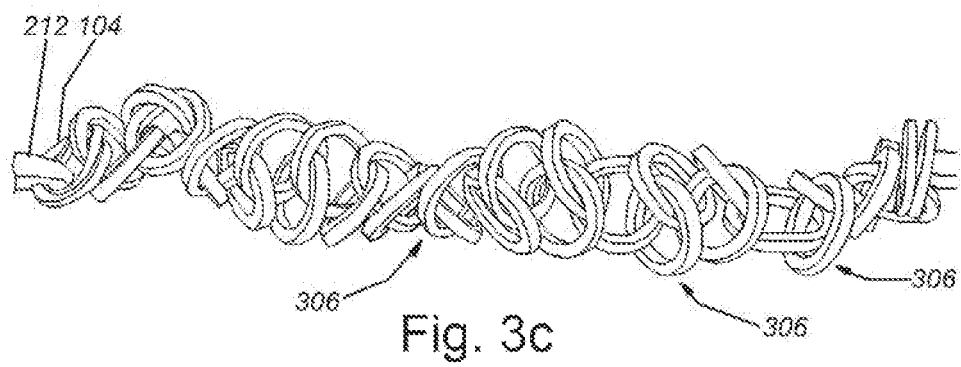
FIG. 3c is a perspective view of an LSA with an applied twisting force and nearly complete stacking, according to the illustrative embodiment.

FIG. 3c is a perspective view of an LSA with an applied twisting force and nearly complete stacking, according to the illustrative embodiment. As shown in FIG. 3c, most of the links 102 have become both stacking links 302 and central links 304, so that most links 102 are now part of stacks 306. The chain length CL is now shorter than in the previous figure. Individual links in the stacking pattern can have an axial rotary offset from other stacked links, and the nature of the stacking pattern can be at least partially determined by the shape, size, cross-section, and overall design of the links. The stacking pattern can also vary by applied forces of rotation, tension, and/or angle relative to gravity or other forces.

Figure 4A:
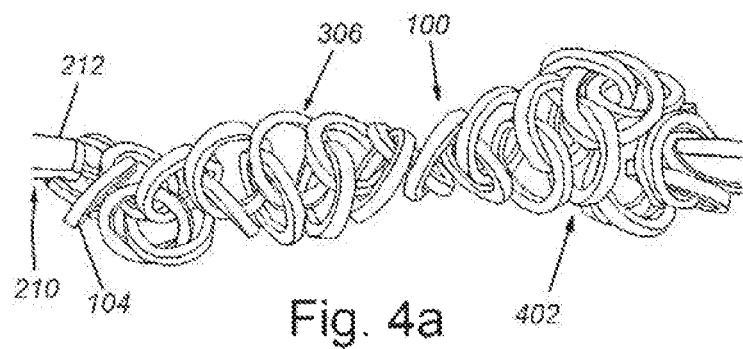
FIG. 4a is a perspective view of an LSA with an applied twisting force and a second degree of stacking, according to the illustrative embodiment.
Figure 4B:
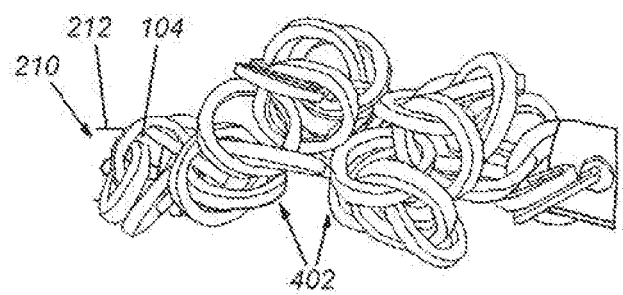
FIG. 4b is a perspective view of an LSA with an applied twisting force and an increased second degree of stacking, according to the illustrative embodiment.

FIG. 4a is a perspective view of an LSA with an applied twisting force and a second degree of stacking, according to the illustrative embodiment. As additional rotation is applied to the terminal link 104 at the powered end 210, some of the previously stacked links can now begin to stack again creating a second order stack 402. In the second order stack 402, individual links can be in contact with an increasing number of other links. The chain 100 is now in a second-order stacked conformation, which can be referred to as stage 3. As the individual links are gathered into second order stacks, the chain length continues to decrease. FIG. 4b is a perspective view of an LSA with an applied twisting force and an increased second degree of stacking. FIG. 4b depicts the LSA with continued additional rotation applied to the terminal link 104 at the powered end 210, so that the second order stack 402 continues to propagate throughout the chain, and the chain length continues to decrease. In stage 3, and in all following possible stages, the previously stacked links can begin to stack again, but now as a link assembly. These link assembly stages increase in torque arm, series width, and stack complexity, while allowing for extreme compression of distance and relative speed of operation. Link series design can be tailored for the desired tension and compression characteristics.

Figure 5:
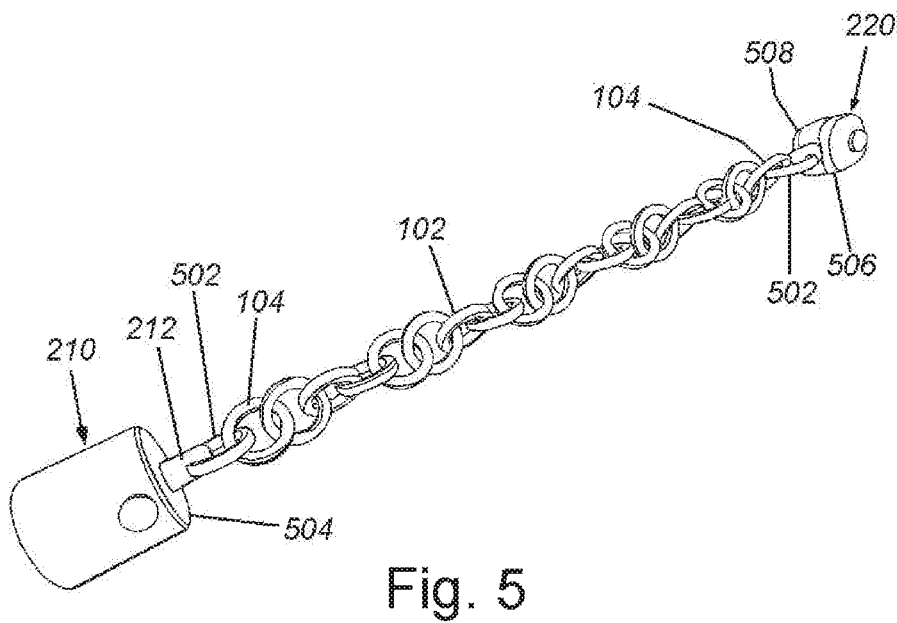
FIG. 5 is a perspective view of a of an LSA with a powered end and a fixed end, according to an embodiment.

FIG. 5 is a perspective view of an exemplary configuration of an LSA with a fixed end, according to an embodiment. The LSA can have a powered end 210 with a powered rotating shaft 212, and a fixed end 220. The terminal link 104 at the powered end can be engaged with a loop 502 that can be a unitary part of the powered drive shaft 212. The powered driveshaft can be operatively connected to a motor 504. The motor can be affixed to a stationary, or non-rotating surface. When the motor provides rotational force to the powered rotating shaft 212, the terminal link 104 is rotated, which in tern rotates other links 102 in the chain 100. The fixed end 220 has a loop 502 that can be a unitary part of a non-rotating shaft 506 that can be connected to a fixed mounting body 508. The fixed mounting body 508 can be affixed to a stationary, or non-rotating surface. In various embodiments, the terminal link 104 at the fixed end 220 can be affixed directly to any stationary, or non-rotating surface.

The motor(s) speed and torque can be highly variable, depending upon the force and response performance requirements of the mechanism. In general, a lower torque motor can be coupled with a reduction gear (or other type) of power transmission to increase torque. Higher torque motors can also be coupled with an induction gear transmission to increase speed. Direct drive is also contemplated. The motor can be driven by electricity, which can be provided by batteries, wall current, solar-generated current, fuel cells, inductive coupling, but can also be driven by other energy sources. Such energy sources include internal combustion, compressed gas, heat engines, clockwork mechanism, hand-powered, etc.

Figure 6:
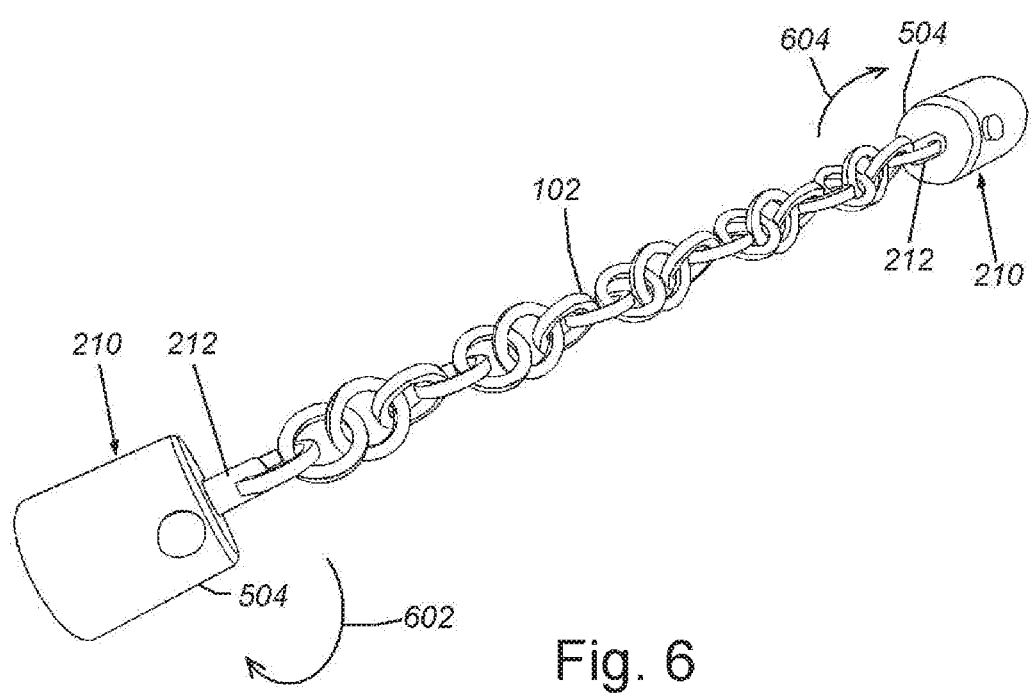
FIG. 6 is a perspective view of a of an LSA with two powered ends, according to an embodiment.

FIG. 6 is a perspective view of an LSA with two powered ends, according to an embodiment. An LSA can have two powered ends 210, and each powered end 210 can have a rotating shaft 212 and a motor 504. The motors 504 can be configured to turn in opposing directions, with a first motor 504 rotating along directional arrow 602, and a second motor 504 rotating along directional arrow 604. The two motors 504 can rotate in opposite directions so that they can work together to shorten the chain length CL. To lengthen the chain length CL, the two motors can each reverse direction until the chain is in stage 0 and a maximum chain length has been reached. Variously, one motor can be held in a fixed orientation so that it does not rotate, while the second motor rotates to shorten or lengthen the chain, or the motors can alternate between holding a fixed position and providing rotational force. Alternating between motors can allow one motor to work while the other motor can be in a cooling phase to dissipate excess heat generated by the motor. In an embodiment, the two motors can be different types of motors that can be selected from a faster motor, a higher torque motor, a motor that can sense tactile feedback and detect resistance, or other possible types of motors. The use of two different motors can be useful in applications such as robotic fingers so that high strength and/or delicate touch can be applied by different motors as necessary in different tasks.

Figure 7:
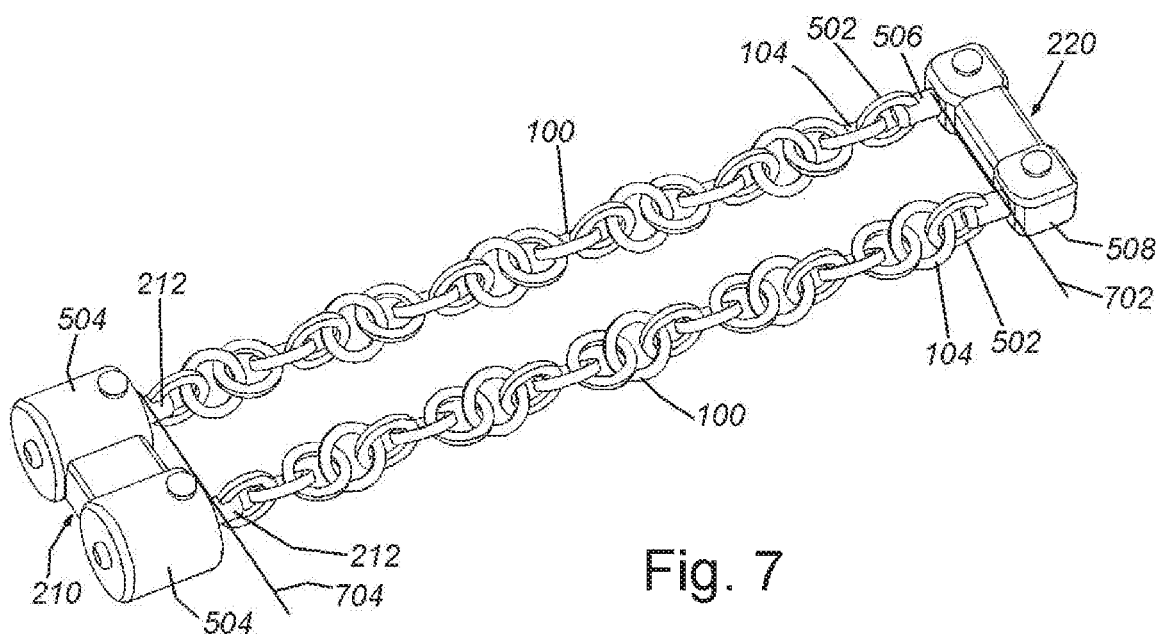
FIG. 7 is a perspective view of an exemplary LSA with two chains, a fixed end, and two side-by-side (tandem) actuating elements with individually powered rotating shafts, according to an embodiment.

FIG. 7 is a perspective view of an exemplary LSA with two chains, a fixed end, and two side-by-side (tandem) actuating elements with individually powered rotating shafts, according to an embodiment. The LSA can have a powered end 210 and a fixed end 220, with two chains 100 between the powered end 210 and the fixed end 220. The fixed end 220 can have two loops 502 that can be a unitary part of non-rotating shafts 506 that can be connected to a fixed mounting body 508. In various embodiments, the terminal link 104 can be connected to the fixed mounting body 508 using various alternate means that will be obvious to one of skill in the art. A fixed-end line 702 can be defined by the two points where the terminal links 104 are attached to the fixed mounting body 508. The powered end can have two tandem actuating elements, or motors, 504 that can each power separate powered rotating shafts 212 that are each attached to terminal links 104 of the chains 100, as shown in FIG. 7. A powered-end line 704 can be defined by the two points where the terminal links 104 are attached to the powered rotating shafts 212.

The motors 504 can be configured to rotate in opposite directions, so that the chains 100 can be shortened by twisting the chains in opposite directions. By rotating the powered shafts 212 at the same speed but in opposite directions, the fixed end line 702 and the powered-end line 704 can be maintained in a parallel orientation while the chain is shortened and lengthened. This embodiment can increase the strength of the system by using two motors and two chains. This embodiment can also provide a fail-safe, so that in the event that one motor or chain fails, the other motor and chain can continue to function. Variously, both motors can rotate simultaneously to shorten or lengthen both chains together, or individual motors can be engaged separately or at different speeds so that the fixed-end line 702 and the powered-end line 704 can be adjusted into an angled orientation.

It is specifically contemplated that more than two sets of chains and motors can be used, and they can be arranged in a line, or can be arranged in various other arrangements. In an exemplary embodiment, four chains and four motors can be used, and the terminal ends can be arranged in square arrangements, so that the plane defined by the non-powered terminal ends can be moved closer or farther from the plane defined by the powered terminal ends by rotating all motors together to keep the planes parallel, or individual motors can be rotated to change the angle between the planes, and/or various combinations of motor rotations can allow the planes to move and shift relative to each other for various tasks. Various numbers of chains and motors can be employed in various arrangements depending on the tasks to be accomplished.

Figure 8:
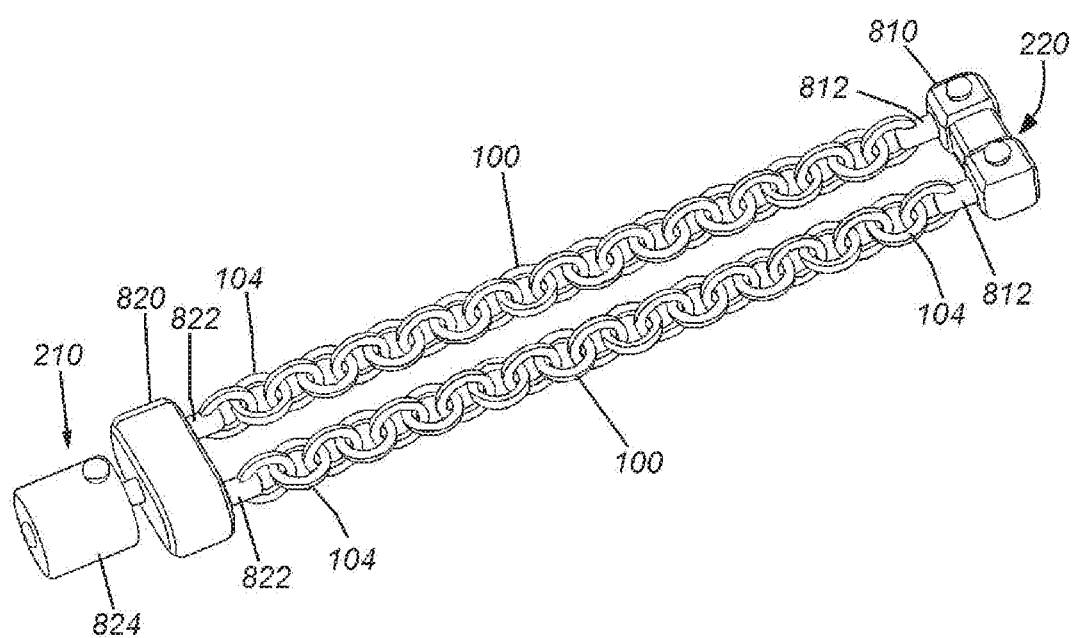
FIG. 8 is a perspective view of an exemplary LSA with two chains, a fixed end, and a powered end with a motor configured to twist the two chains around each other, according to an embodiment.

FIG. 8 is a perspective view of an exemplary LSA with two chains, a fixed end, and a powered end with a motor configured to twist the two chains around each other, according to an embodiment. An LSA can have a fixed end 220 and a powered end 210. The fixed end 220 can have a fixed mount body 810 that can be secured to a stationary, or non-rotating surface. The fixed mount body 810 can have two fixed-end shafts 812 that can be connected to terminal ends 104. The fixed end shafts 812 can be secured to the fixed mount body 810 so that they do not rotate relative to the fixed mount body 810, or they can be rotating shafts that can be allowed to rotate freely relative to the fixed mount body 810. The powered end can have a rotating mount body 820 with two powered-end shafts 822 that can be connected to terminal ends 104. The powered end shafts 822 can be secured to the rotating mount body 820 so that they do not rotate relative to the rotating mount body 820, or they can be rotating shafts that can be allowed to rotate freely relative to the rotating mount body 820. A motor 824 can be operatively connected to the rotating mount body 820. The motor 824 can rotate the rotating mount body 820, so that the two chains 100 can be twisted around each other, thereby shortening the chain length CL between the terminal ends 104. This configuration can be tailored towards higher tension, lower contraction distance applications. In an alternate embodiment, two motors can be located within the rotating mount body and can be operatively connected to the powered end shafts 822, so that a single chain can be twisted by itself, both chains can be twisted by themselves, or both chains can be twisted around each other, depending on the task to be accomplished and which motors are rotated and which motors are maintained in a fixed position.

Figure 9:
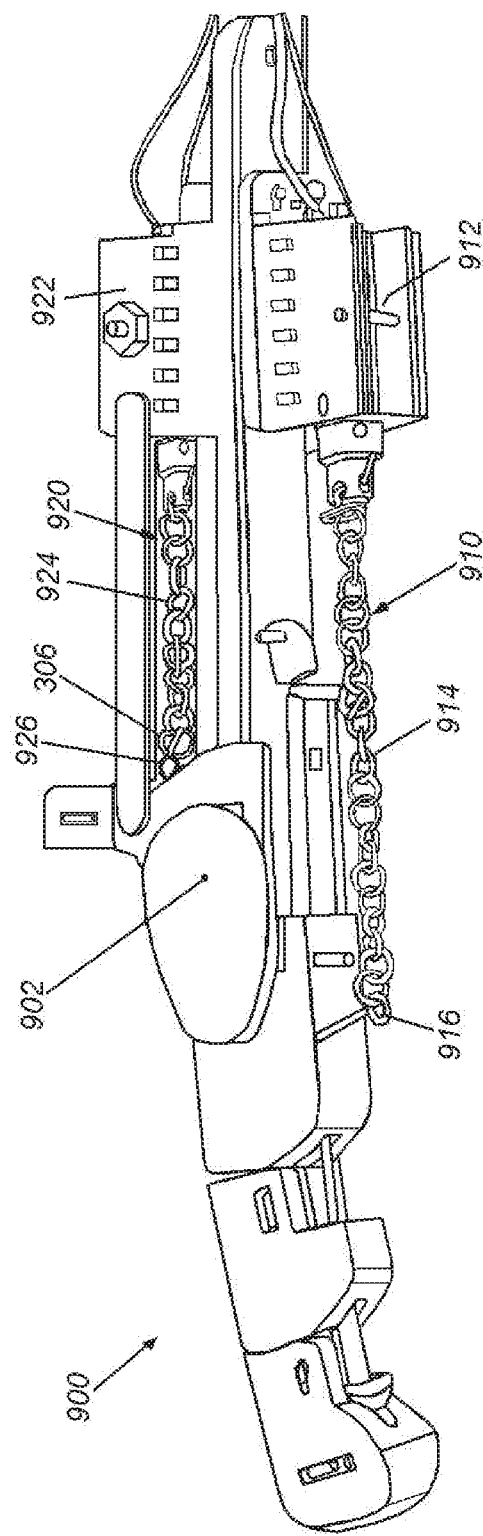
FIG. 9 is a perspective view of a pair of LSA located on opposing sides of a hinged joint, acting on the hinged joint to effect motion therein, in which the joint is extended to a first orientation, according to an embodiment.

FIG. 9 is a diagram of a pair of LSAs located on opposing sides of a hinged joint, acting on the hinged joint to effect motion therein, in which the joint is extended to a first orientation. A system capable of bi-directional movement, such as a hinged robotic finger 900, can have two LSAs on opposing sides of a hinge or joint. A robotic finger 900 can have a hinge 902, a flexor LSA 910, and an extender LSA 920. A flexor LSA 910 can have a flexor motor 912, a flexor chain 914, and a flexor fixed mount 916. An extender LSA 920 can have an extender motor 922, an extender chain 924, and an extender fixed mount 926. As shown in FIG. 9, the extender motor 922 has been rotated in a first direction, so that the extender chain 924 has been twisted into stage 2 with a stack 306 in the extender chain 924. The robotic finger 900 can be extended into the first orientation by rotating the extender motor 922 and shortening the extender chain 924, which pulls on the extender mount 926 and straightens the robotic finger 900. As the extender chain 924 is shortened, the flexor LSA 910 can be in a relaxed state, so that the flexor motor 912 can allow passive rotation and expansion of the flexor chain 914 as the extender chain 924 shortens, or the flexor motor 912 can counter-rotate while the extender motor 922 rotates, so that the flexor chain 914 lengthens as the extender chain 924 shortens. When the finger is in a fully extended state, the flexor motor 912 can be in a relaxed state, or the flexor motor can be in a locked state, so that the flexor motor does not rotate. Both motors can be held in a locked state, which can hold the joints in a rigid position.

Note that the term "hinge", as used herein, should be taken broadly to include a variety of structures that allow two members to bend along at least one, and potentially multiple axes (degrees of freedom) including, but not limited to, conventional, single axis pin-based hinges, single and multi-axis spring hinges (i.e. a hinge based upon a coil or other flexible joint between members and a single or multi-axis live hinges constructed from a flexible metal and/or polymer. A hinge can also comprise a captured or floating ball and socket, or equivalent structure—for example similar to a bone joint.

Figure 10:
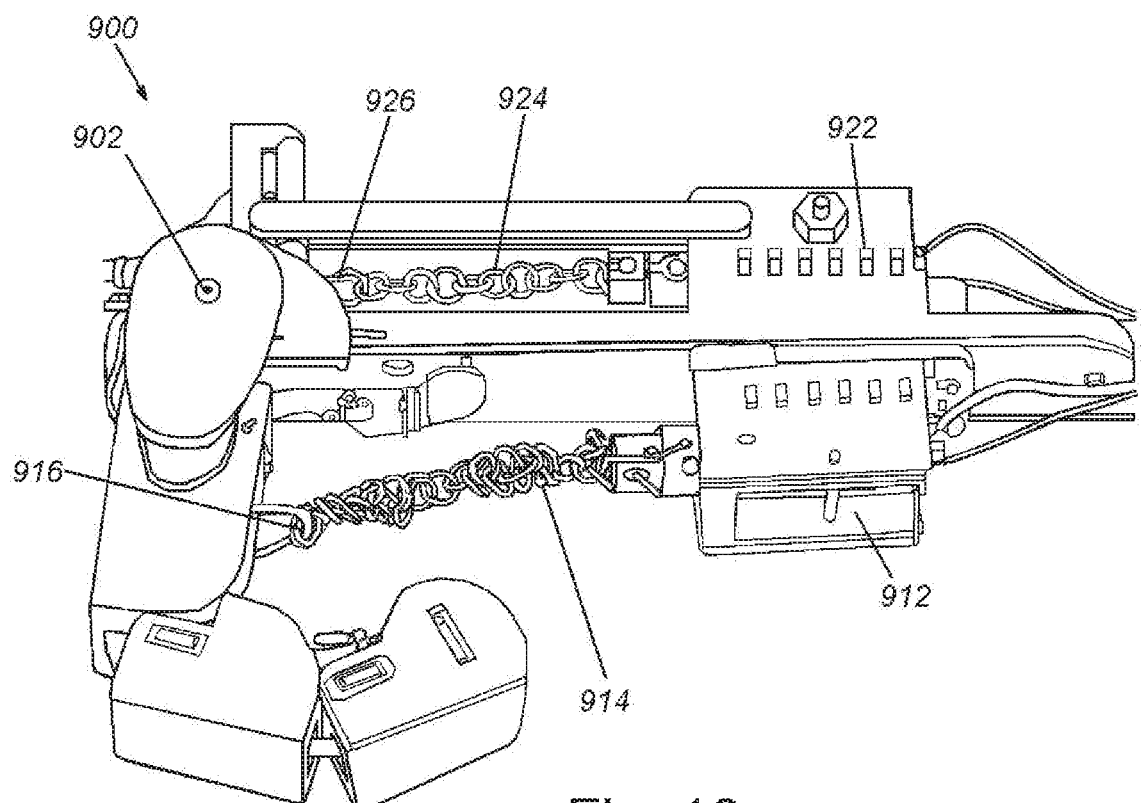
FIG. 10 is a perspective view of the hinged joint of FIG. 9 shown with the joint bent to a second orientation, according to the embodiment.

FIG. 10 is a diagram of the hinged joint of FIG. 9 shown with the joint bent to a second orientation, according to the embodiment. The extender motor 922 has been rotated in the second direction and the extender chain 924 has been untwisted, so that the extender chain 924 is at a maximum chain length. The flexor motor 912 has been rotated in a first direction so that the flexor chain 914 has been twisted into stage 2 with a stack 306 in the flexor chain 914. The robotic finger has been flexed into the second orientation by rotating the flexor motor 912 and shortening the flexor chain 914, which pulls on the flexor mount 916 and flexes the robotic finger 900.

Figure 11:
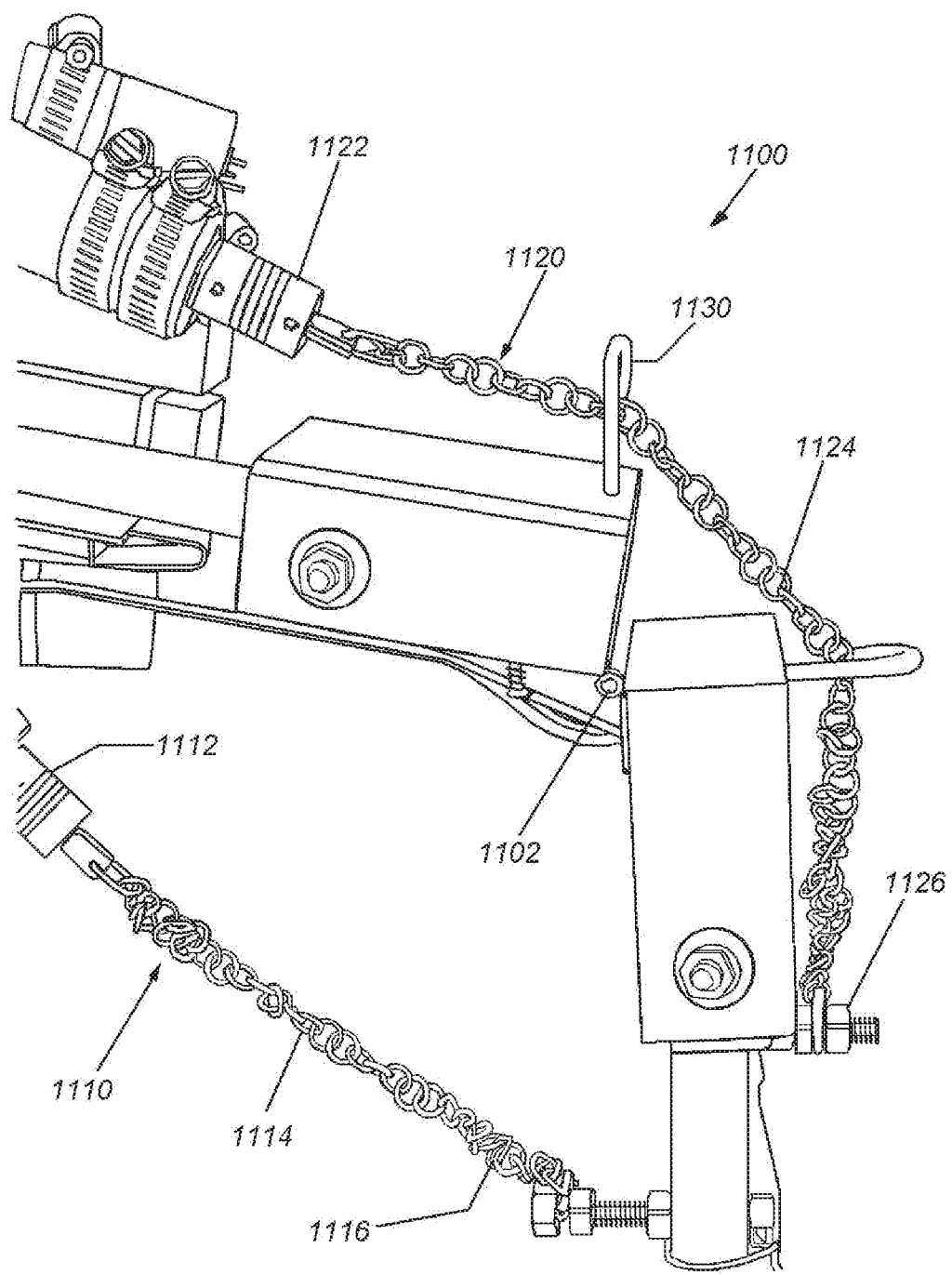
FIG. 11 a perspective view of an exemplary knee joint with a pair of LSAs on each of opposing sides of the joint hinge, in which the actuating motor is relatively remote from the end of each LSA, and the LSA chain effectively snakes around the structure, the knee joint being shown in an exemplary flexed orientation.

FIG. 11 a perspective view of an exemplary knee joint with a pair of LSAs on each of opposing sides of the joint hinge, in which the actuating motor is relatively remote from the end of each LSA, and the LSA chain effectively snakes around the structure, the knee joint being shown in an exemplary flexed orientation, according to an embodiment. The exemplary knee joint 1100 can have a hinge 1102, a flexor LSA 1110, and an extender LSA 1120. The flexor LSA can have a flexor motor 1112, a flexor chain 1114, and a flexor mount 1116. The extender LSA 1120 can have an extender motor 1122, an extender chain 1124, and an extender mount 1126.

The exemplary knee joint can be flexed into a bent orientation by rotating the flexor motor 1112 in a first direction to rotate the flexor chain 1114, thereby shortening the flexor chain 1114 and pulling on the flexor mount 1116. By pulling the flexor mount 1116, the knee joint 1100 is flexed into a bent orientation. As shown in FIG. 11, the LSA can allow a chain, such as the extender chain 1124, to be positioned around corners, through loops 1130, etc. A motor, such as the extender motor 1122, can be located in a position remote from the joint, and the chain can extend over a distance, through a sheath, around multiple corners, etc. to power a remote joint. As the flexor chain 1114 is shortened to flex the knee joint, the extender chain 1124 can be untwisted to lengthen the extender chain 1124, so that the knee joint can be allowed to flex. The extender LSA 1120 can be relaxed while the flexor LSA 1110 is twisted into a shortened conformation, and, conversely, the flexor LSA can be relaxed while the extender LSA 1120 is twisted into a shortened conformation.

Figure 12:
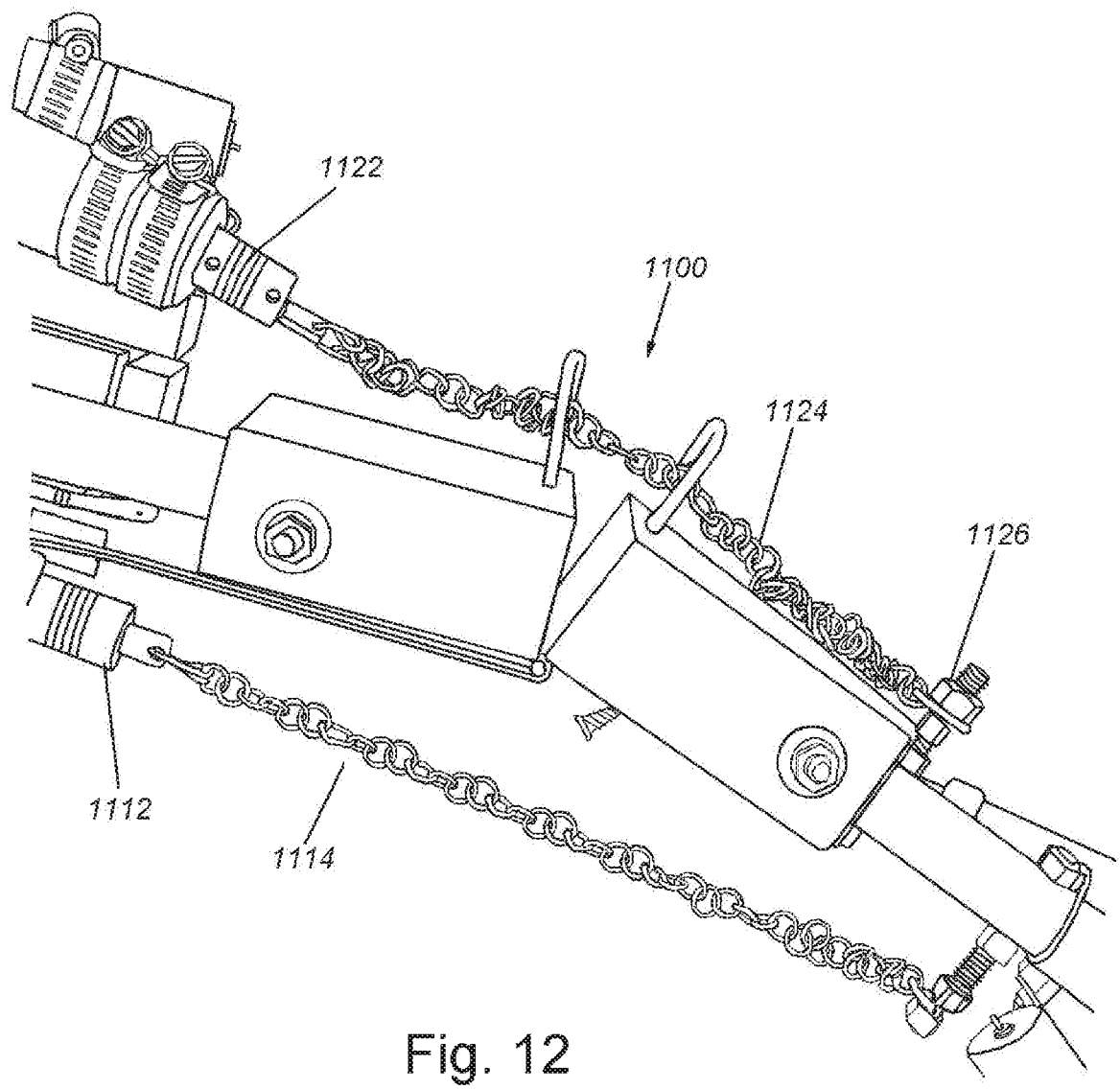
FIG. 12 is a diagram of the knee joint of FIG. 11, in which the LSAs have been actuated to place the knee joint in a partially bent, intermediate orientation.

FIG. 12 is a diagram of the knee joint of FIG. 11, in which the LSAs have been actuated to place the knee joint in a partially bent, intermediate orientation. To achieve the partially bent orientation, the flexor motor 1112 can be rotated in a second direction, thereby allowing the flexor chain 1114 to extend, while the extender motor 1122 can be rotated in the first direction thereby shortening the extender chain 1124 and pulling on the extender mount 1126. By pulling on the extender mount 1126, the knee joint 1100 is extended into a partially bent orientation.

Figure 13:
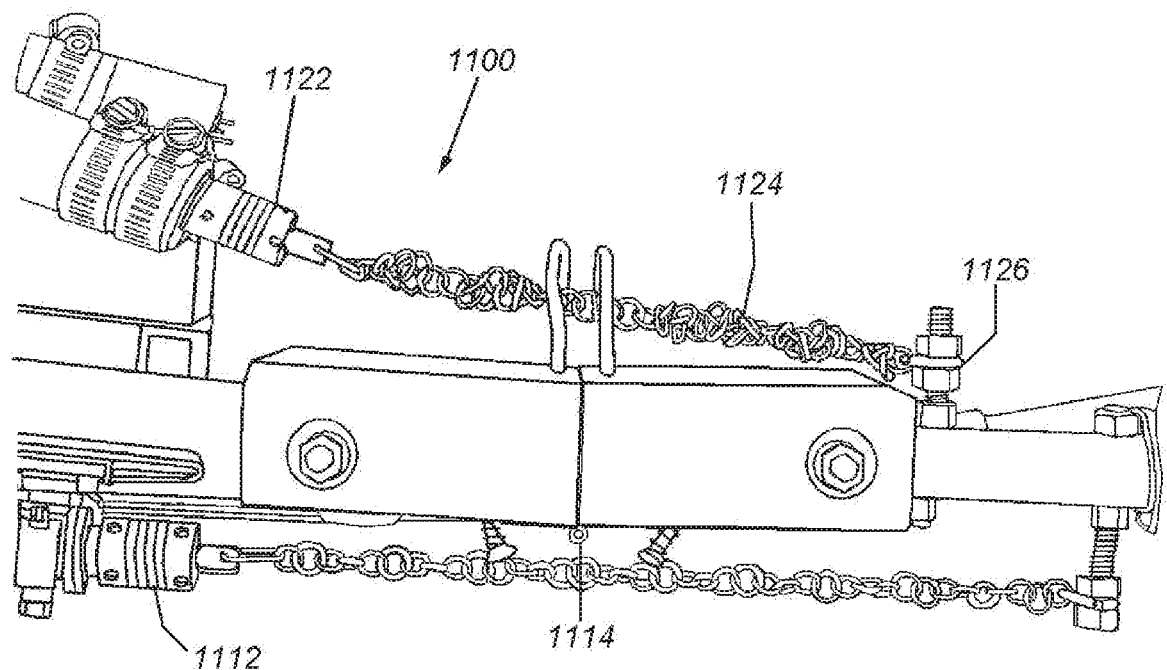
FIG. 13 is a diagram of the knee joint of FIG. 11 in which the LSAs have been actuated to place the knee joint in a fully extended orientation.

FIG. 13 is a diagram of the knee joint of FIG. 9 in which the LSAs have been actuated to place the knee joint in a fully extended orientation. To achieve the fully extended orientation, the flexor motor 1112 can be rotated in a second direction, thereby allowing the flexor chain 1114 to extend further, while the extender motor 1122 can be rotated further in the first direction, thereby further shortening the extender chain 1124 and pulling further on the extender mount 1126. By pulling further on the extender mount 1126, the knee joint 1100 is extended into a fully extended position.

Figure 14:
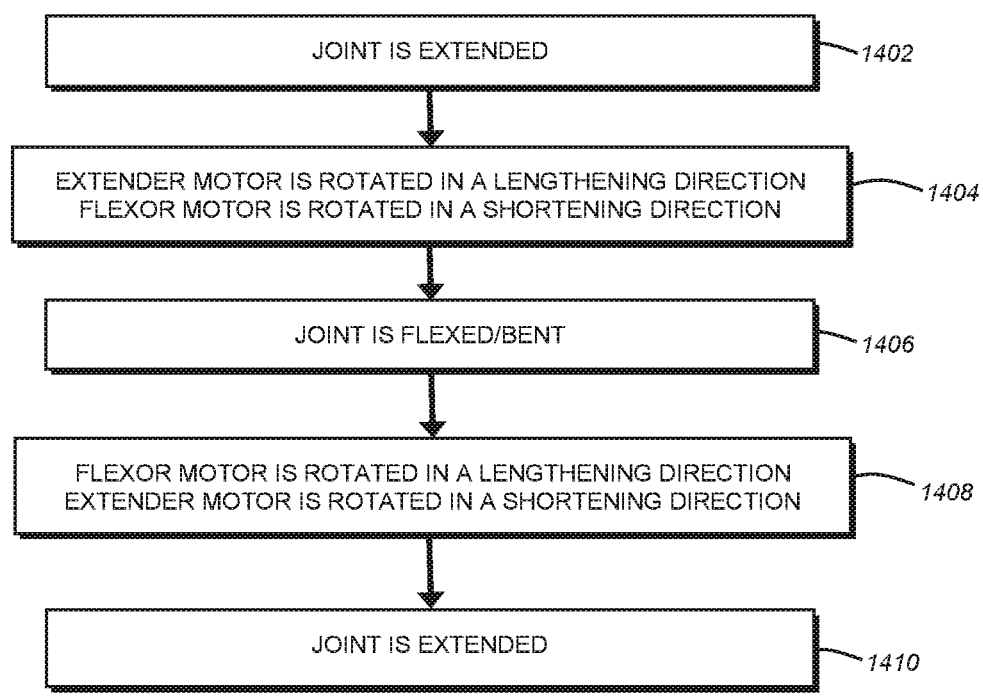
FIG. 14 is a diagram showing the actuation of flexor and extender LSAs to operate a joint, according to an embodiment.

FIG. 14 is a diagram showing the actuation of flexor and extender LSAs to operate a joint, according to an embodiment. At 1402, a joint is in an extended position. At 1404, the joint can be moved in a flexing direction. The extender motor can be rotated in a lengthening direction so that the extender chain is lengthened, and the flexor motor can be rotated in a shortening direction so that the flexor chain is shortened, and the joint moves in a flexing direction. At 1406, the joint can be in a flexed orientation. At 1408, the joint can be moved in an extending direction. The flexor motor can be rotated in a lengthening direction so that the flexor chain can be lengthened, and the extender motor can be rotated in a shortening direction so that the extender chain is shortened, and the joint moves in an extending direction. At 1410, the joint has returned to an extended position.

Applications for an LSA can include robotic actuation and prosthetic arm and leg actuation. The LSA is fully scalable, and can be used for applications including, but not limited to, miniature sizes for toys up to large sizes for industrial applications such as earth moving. Additional applications, such as moving control surfaces in aircraft, watercraft, spacecraft and the like are also contemplated.

It should be clear that the above-described LSA provides a highly versatile, robust and effective mechanism for actuating a variety of movable structures. The mechanism can be made compact and conform to tight quarters within enclosures, but still provide substantial force for the amount of applied energy. Advantageously, in the field of prosthetics and robotics, the structure closely approximates the forces generated by muscle/tendon tissues.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, in alternate embodiments, counter-rotating motors can be placed in the middle of a chain, with a first motor facing one way and rotating in a first direction, and a second motor facing the other way and rotating in a second direction. In alternate embodiments, three or more LSAs can be connected at a single central point, or hub, so that the hub can be moved in more than two directions, possibly including movement in three dimensions. Also, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A link stacking actuator system comprising:
    a first chain comprising a series of adjacent links, the first chain having a first end and a second end; and
    a first rotational motor connected to the first end, the first rotational motor connected to a non-rotating surface, wherein rotation of the first rotational motor twists the first chain, thereby stacking the links to shorten the first chain, resulting in forceful contraction of the first chain, wherein the rotation of the first rotational motor further twists the first chain and stacks the links in a second order stack with previously stacked links stacking again to create the second order stack, the second order stack having at least one link in contact with at least three other links.

2. The system of claim 1, further comprising a second rotational motor connected to the second end, the second rotational motor connected to a non-rotating surface, wherein rotation of the second rotational motor twists the first chain, thereby shortening the first chain.

3. The system of claim 1, further comprising a second chain, the second chain having a third end and a fourth end, wherein the second end and the fourth end are connected to a mounting body, and further comprising a second rotational motor connected to the third end, wherein rotation of the second rotational motor twists the second chain, thereby shortening the second chain, and wherein the first rotational motor and the second rotational motor can rotate individually or simultaneously so that the first chain and the second chain can be shortened individually or simultaneously.

4. The system as set forth in claim 1 wherein the links comprise a durable metal material.

5. The system as set forth in claim 4 wherein the links are joined at a joint thereof, so as to be free of gaps.

6. The system as set forth in claim 1 wherein the links define a perimeter shape that is at least one of a circular, polygonal and elliptical.

7. The system as set forth in claim 1 wherein the links define a cross section that is at least one of circular, polygonal and elliptical.

8. The system as set forth in claim 1 wherein the first rotational motor is connected to a first member and the second end is connected to a second member and wherein the first member and the second member are connected by a hinge.

9. The system as set forth in claim 8 wherein the hinge defines at least one of a single-axis or multi-axis hinge.

10. The system as set forth in claim 9 wherein the hinge includes one or more pins, a spring structure or a living hinge structure.

11. The system as set forth in claim 8 wherein the first member and the second member are part of a robot manipulator having a controller that moves the first rotational motor based upon a desired degree of motion of the first member with respect to the second member.

12. The system as set forth in claim 1, wherein the links are annular links.

13. The system as set forth in claim 12, wherein the annular links have cross sections with two parallel sides.

14. The system as set forth in claim 1, wherein the rotation of the first rotational motor twists the first chain and stacks the second order stack to create a link assembly.

15. A method for actuating a hinged structure comprising the steps of:
providing a first chain comprising a series of adjacent links, the first chain having a first end and a second end;
driving a first rotational motor connected to the first end, the first rotational motor connected to a non-rotating surface, in a first rotational direction so as to twist the first chain, thereby stacking the links to shorten the first chain resulting in forceful contraction of the first chain and thereby causing the hinged structure to bend in a first bending direction because of the contraction force; and
stacking the links to create a second order stack with previously stacked links stacking again to create the second order stack, the second order stack having at least one link in contact with at least three other links.

16. The method as set forth in claim 15, further comprising, driving the first rotational motor in a second rotational direction, opposite the first rotational direction, so as to twist the first chain, thereby lengthening the first chain and causing the hinged structure to bend in a second bending direction opposite the first bending direction.

17. The method set forth in claim 15, wherein stacking the links further comprises stacking the second order stack to create a link assembly.

18. A link stacking actuator system comprising:
a single chain comprising a series of adjacent annular links, the single chain having a first end and a second end; and
a rotational motor connected to the first end, the rotational motor connected to a non-rotating surface, wherein rotation of the rotational motor twists the single chain upon itself, thereby stacking at least one link of the single chain onto an adjacent link of the single chain and providing a contraction force that shortens the single chain through a conversion of a rotational force into a contraction force, wherein the rotation of the rotational motor further twists the single chain and stacks the links in a second order stack with previously stacked links stacking again to create the second order stack, the second order stack having at least one link in contact with at least three other links.

19. The system as set forth in claim 18, wherein the annular links have cross sections with two parallel flat surfaces.

20. The system as set forth in claim 18, wherein the rotation of the rotational motor twists the single chain and stacks the second order stack to create a link assembly.

* * * * *